United States Patent
Yoshigahara

(10) Patent No.: US 6,973,131 B2
(45) Date of Patent: Dec. 6, 2005

(54) DECODING APPARATUS, DECODING METHOD, DECODING PROCESSING PROGRAM AND COMPUTER-READABLE STORAGE MEDIUM HAVING DECODING PROCESSING PROGRAM CODES STORED THEREIN

(75) Inventor: Noriyuki Yoshigahara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 09/995,103

(22) Filed: Nov. 27, 2001

(65) Prior Publication Data

US 2002/0064230 A1    May 30, 2002

(30) Foreign Application Priority Data

Nov. 28, 2000  (JP)  .............................. 2000-360465

(51) Int. Cl.[7] .............................................. H04N 7/12

(52) U.S. Cl. .................................. 375/240.25; 345/637
(58) Field of Search ...................... 375/240.25, 240.24; 718/108; 370/232; 386/68; 348/397.1; 345/637

(56) References Cited

U.S. PATENT DOCUMENTS

| | | | | |
|---|---|---|---|---|
| 5,805,762 A | * | 9/1998 | Boyce et al. | ................... 386/68 |
| 6,384,846 B1 | * | 5/2002 | Hiroi | ........................... 345/794 |
| 6,445,679 B1 | * | 9/2002 | Taniguchi et al. | ........... 370/232 |
| 6,477,562 B2 | * | 11/2002 | Nemirovsky et al. | ....... 718/108 |

* cited by examiner

Primary Examiner—Gims Philippe
(74) Attorney, Agent, or Firm—Morgan & Finnegan, L.L.P.

(57) ABSTRACT

A decoding processing method for decoding a plurality kinds of encoded streams comprises the steps of inputting a plurality kinds of encoded streams, determining priority among the inputted plurality kinds of encoded streams and decoding the plurality kinds of encoded streams by decoding processing according to the determined priority.

11 Claims, 10 Drawing Sheets

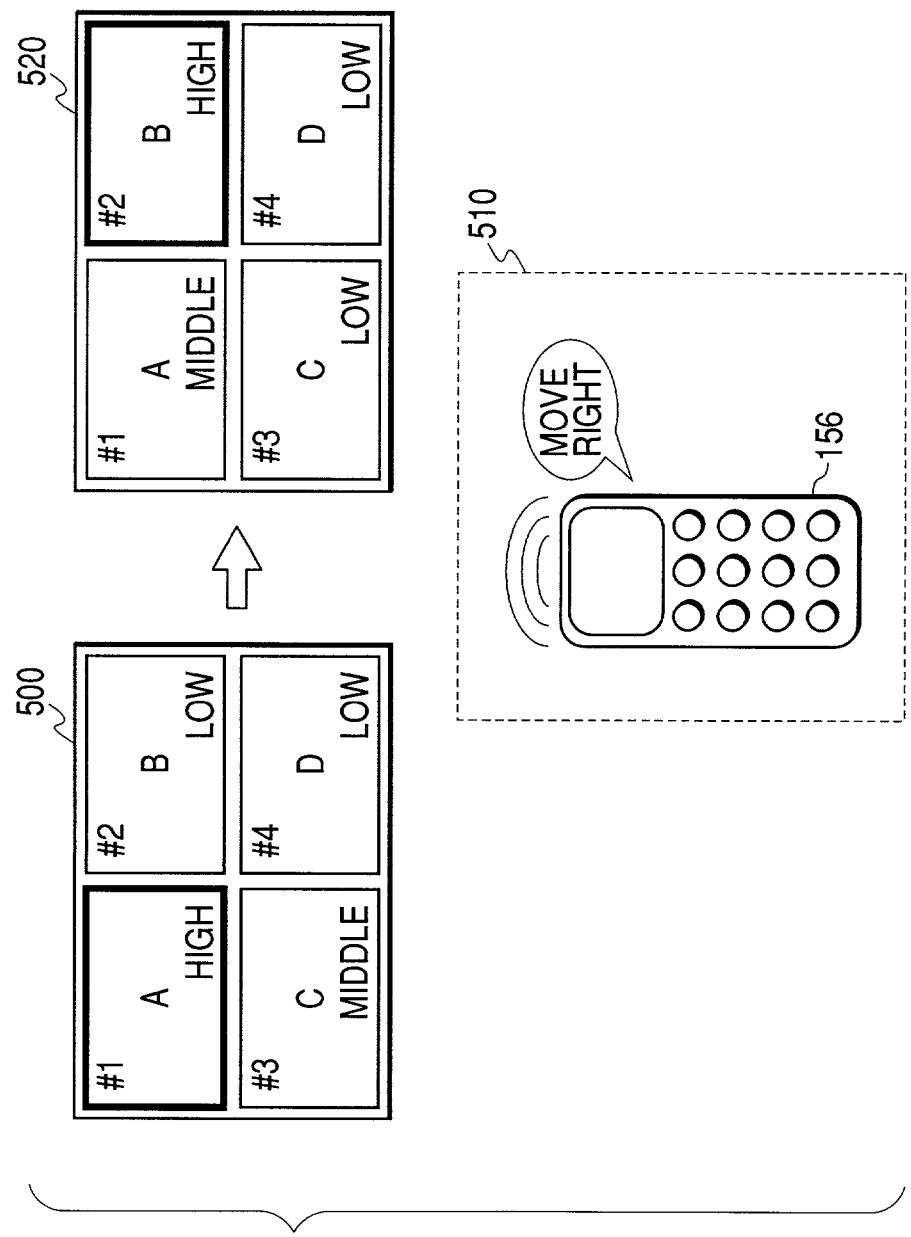

DECODING APPARATUS, DECODING METHOD, DECODING PROCESSING PROGRAM AND COMPUTER-READABLE STORAGE MEDIUM HAVING DECODING PROCESSING PROGRAM CODES STORED THEREIN

BACKGROUND OF THE INVENTION

1. Field of the Invention

The present invention relates to a decoding apparatus for decoding encoded stream data and a method of decoding the same, as well as a decoding processing program recorded in a computer-readable medium and a computer-readable storage medium having codes of the decoding processing program stored therein.

2. Related Background Art

FIG. 1 is a block diagram showing a schematic configuration of a digital television receiver in which a conventional compressed stream decoding apparatus is used.

A stream reception apparatus 210 receives a compressed stream from a tuner (not shown) and applies the received compressed stream to a demultiplexer 214 via a stream control circuit 212.

The demultiplexer 214 separates an incoming compressed stream into individual elementary streams (ES) to store them in an ES storage buffer 216. A variable length decoding circuit 218 applies variable length decoding to the compressed stream stored in the ES storage buffer 216. An inverse quantization circuit 220 inversely quantizes an output of the variable length decoding circuit 218. An 8×8 inverse DCT circuit 222 applies inverse discrete cosine transformation to an output of the inverse quantization circuit 220 on a 8×8 block basis. A motion compensation circuit 224 applies motion compensation to a P picture and B pictures in an output of the 8×8 inverse DCT circuit 222 to output restored image data.

An enlargement and reduction circuit 226 enlarges and reduces an outputted image from the motion compensation circuit 224 into a size adjusted to a window size for displaying it, which size is instructed by a system control circuit 238. An output of the enlargement and reduction circuit 226 is temporarily stored in a delay buffer 228 and read out at timing synchronizingly adjusted by the system control circuit 238 and a display control circuit 230 to be applied to a display apparatus 232. The display apparatus 232 consists of a CRT or a liquid crystal display device and displays image data from the display control circuit 230 as an image.

A processing circuit 234 performs processings other than decoding processing, such as an image editing and downloading, and an I/O 236 connects the digital television receiver to other apparatuses such as a scanner and a printer.

A remote control reception device 242 receives a remote control signal from a remote controller 240 and notifies the system control circuit 238 of the receipt via a remote-control control circuit 244. Consequently, various instructions of a user such as switching of channels are sent to the system control circuit 238.

Even if there are a plurality of streams that should be decoded, the same processing is carried out for all the streams.

With the conventional digital television receiver, if a plurality kinds of processing including decoding processing are simultaneously executed, frames of a decoded video are irregularly dropped to make the video hard to watch, due to over flow or under flow of a buffer used in the decoding processing caused by a performance limit of a processor.

In particular, if a plurality of compressed streams are simultaneously decoded in a multi-window or the like, frame dropping or sound skipping occurs in all the streams due to a processing limit of a processor even when a user desires to view only one of the programs with high grade video and sound.

SUMMARY OF THE INVENTION

The present invention has been devised in view of the above-mentioned problems, and it is an object of the present invention to provide a decoding apparatus that is capable of decoding a desired stream without dropping any part thereof in decoding a plurality of encoded streams and a method of decoding the same, as well as a decoding processing program recorded in a computer-readable medium and a computer-readable storage medium having codes of the decoding processing program stored therein.

Therefore, according to a preferred embodiment of the present invention, a decoding apparatus of the present invention comprises: inputting means for inputting a plurality kinds of encoded streams; determining means for determining priority among the plurality kinds of encoded streams inputted by the inputting means; and decoding means for decoding the plurality kinds of encoded streams by decoding processing that is weighted according to the priority determined by the determining means.

Further, according to an another preferred embodiment, a decoding method of the present invention comprises the steps of: inputting a plurality kinds of encoded streams; determining priority among the inputted plurality kinds of encoded streams; and decoding the plurality kinds of encoded streams by decoding processing that is weighted according to the determined priority.

Further, according to an another preferred embodiment, a decoding processing program of the present invention, recorded in a computer-readable medium comprises: a code of a step of inputting a plurality kinds of encoded streams; a code of a step of determining priority among the inputted plurality kinds of encoded streams; and a code of a step of decoding the plurality kinds of encoded streams by decoding processing that is weighted according to the determined priority.

Furthermore, according to an another preferred embodiment, a computer-readable recording medium of the present invention is characterized by recording: a code of a step of inputting a plurality kinds of encoded streams; a code of a step of determining priority among the inputted plurality kinds of encoded streams; and a code of a step of decoding the plurality kinds of encoded streams by decoding processing that is weighted according to the determined priority.

Other objects, features and advantages of the invention will become apparent from the following detailed description taken in conjunction with the accompanying drawings.

BRIEF DESCRIPTION OF THE DRAWINGS

The accompanying drawings, which are incorporated in and constitute a part of the specification, illustrate an embodiment mode of the invention and, together with the description, serve to explain the principles of the invention.

FIG. 10 illustrates an example of a change in priority in the second embodiment.

DETAILED DESCRIPTION OF THE PREFERRED EMBODIMENTS

Embodiments of the present invention will be hereinafter described in detail with reference to the drawings.

Figure 2:
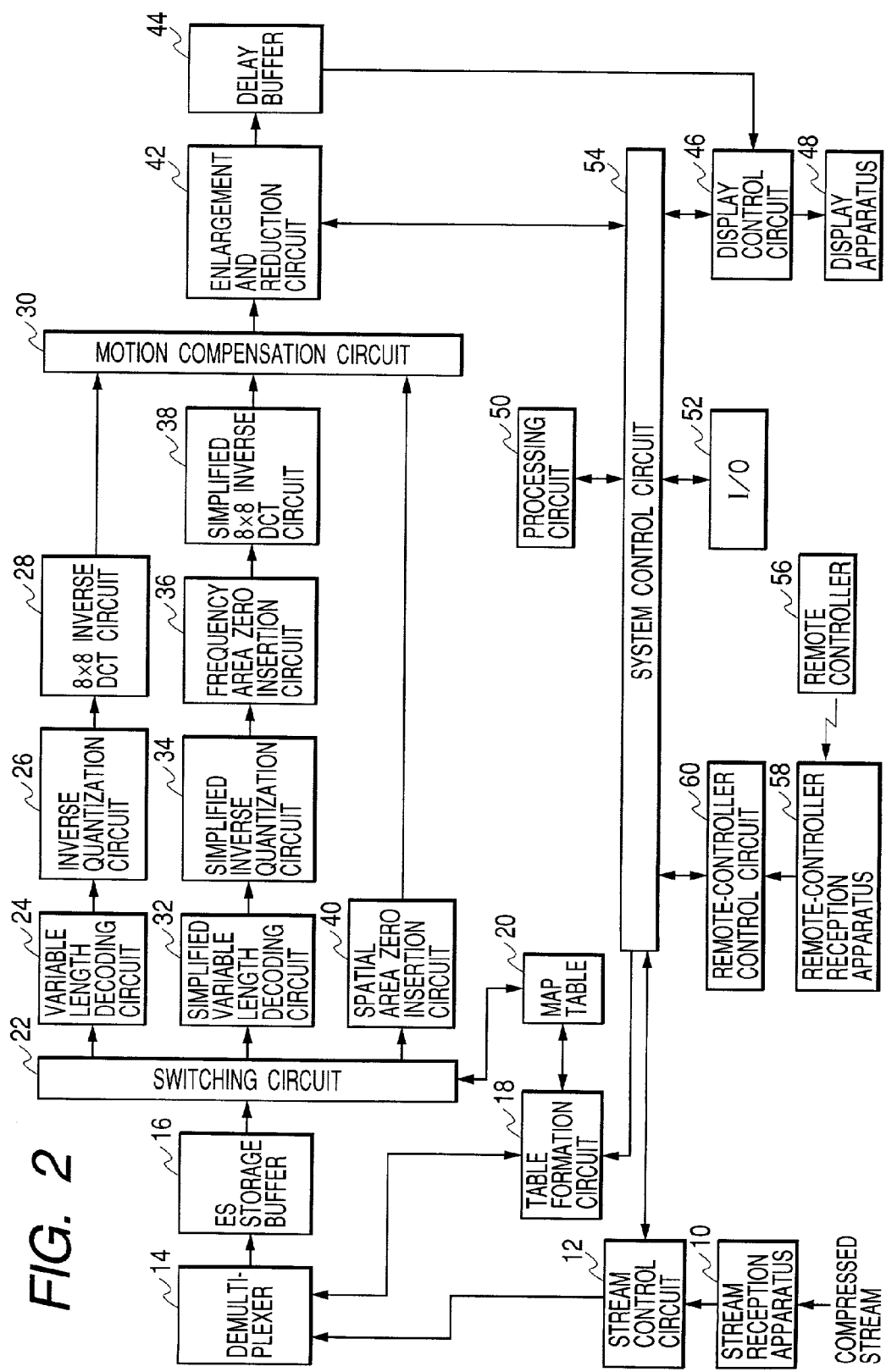
FIG. 2 is a block diagram showing a configuration of a digital television receiver of a first embodiment in accordance with the present invention.

FIG. 2 is a block diagram showing a configuration of a digital television receiver of a first embodiment in accordance with the present invention.

A stream reception apparatus 10 receives a compressed stream from a tuner (not shown) and applies the received compressed stream to a demultiplexer 14 via a stream control circuit 12.

Further, it is assumed that a compressed stream of this embodiment includes image data that is encoded by the MPEG (Moving Picture Experts Group)-2 coding method. However, a method of encoding is not limited to the MPEG-2 but the MPEG-1, the MPEG-4 or the Motion JPEG (Joint Photographic Coding Experts Group) coding method may be applied.

The demultiplexer 14 separates an incoming compressed stream into individual elementary streams (ES) to store them in an ES storage buffer 16. Further, it is assumed that a compressed stream is data that is compressed and encoded by the MPEG-1 or the MPEG-2 coding method in this embodiment.

A table formation circuit 18 assigns priority to each stream based on a ratio between a size of an image received from the demultiplexer 14 and a window size communicated from a display control device 46 via a system control circuit 54 and forms a map table 20 showing association between stream IDs and the priority.

A switching circuit 22 outputs a compressed stream stored in the ES storage buffer 16 to any one of three decoding processing systems A, B and C with reference to the map table 20.

The decoding processing system A consists of a variable length decoding circuit 24, an inverse quantization circuit 26, an 8×8 inverse DCT circuit 28 and a motion compensation circuit 30. The decoding processing system B consists of a simplified variable length decoding circuit 32, a simplified inverse quantization circuit 34, a frequency area zero insertion circuit 36, a simplified 8×8 inverse DCT circuit 38 and the motion compensation circuit 30. The decoding processing system C consists of a spatial area zero insertion circuit 40 and the motion compensation circuit 30.

The motion compensation circuit 30 is utilized in any of the decoding processing systems A, B and C. The decoding processing system A restores a compressed image with a normal image quality, the decoding processing system B restores a compressed image with a low image quality and the decoding processing system C substantially replaces differential image data of a P picture and B pictures of a received image, that is, a picture to which differential encoding is applied, with zero. Details of the processing performed by each of the decoding processing systems A, B and C will be described later.

An enlargement and reduction circuit 42 enlarges and reduces an outputted image from the motion compensation circuit 30 to a size adjusted to a window size for displaying an image, which size is instructed by a system control circuit 54. An output of the enlargement and reduction circuit 42 is temporarily stored in a delay buffer 44 and read out at timing synchronizingly adjusted by a system control circuit 54 and a display control circuit 46 to be applied to a display apparatus 48. The display apparatus 48 consists of a CRT or a liquid crystal display device and displays image data from the display control circuit 46 as an image.

A processing circuit 50 performs processings other than decoding processing, such as image editing and downloading, and an I/O 52 connects the digital television receiver to other apparatuses such as a scanner and a printer.

A remote control reception device 58 receives a remote control signal from a remote controller 56 and notifies the system control circuit 54 of the receipt via a remote-control control circuit 60. Consequently, various instructions of a user such as channel switching are sent to the system control circuit 54.

In this embodiment, processing is switched among processing by the decoding processing system A, processing by the decoding processing system B and the processing by the decoding processing systems B and C according to a load and a required image quality. A load and an image quality decrease in this order.

Operations of the decoding processing system A are now described in detail. The decoding processing system A restores a compressed image with an original image quality. That is, the variable length decoding circuit 24 applies variable length decoding to a compressed stream stored in the ES storage buffer 16. The inverse quantization circuit 26 inversely quantizes an output of the variable length decoding circuit 24. The 8×8 inverse DCT circuit 28 applies 8×8 inverse discrete cosine transformation to an output of the inverse quantization circuit 26. The motion compensation circuit 30 compensates for motions of a P picture and B pictures in an output of the inverse DCT circuit 28 and outputs restored image data.

Operations of the decoding processing system B are now described. The decoding processing system B restores a compressed image with a lower image quality by light load calculation.

Figure 3:
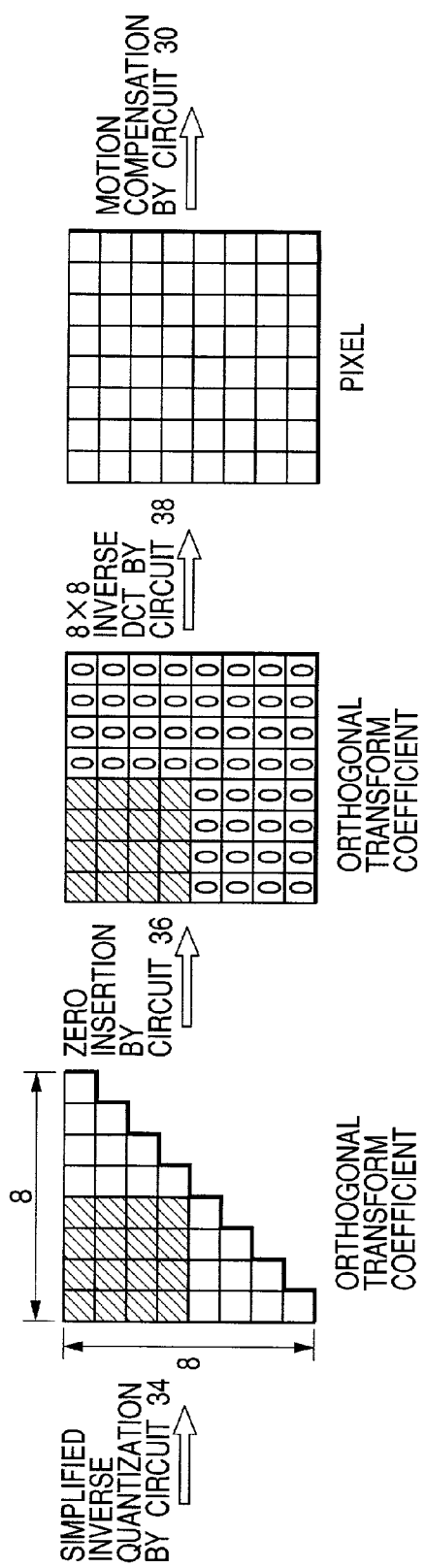
FIG. 3 schematically illustrates processing steps of a decoding processing system B of the first embodiment.

FIG. 3 schematically illustrates processing steps of the decoding processing system B.

The simplified variable length decoding circuit 32 applies variable length decoding only to parts relating to a 4×4 DCT coefficient in a compressed stream stored in the ES storage buffer 16. The simplified inverse quantization circuit 34 inversely quantizes an output of the simplified variable length decoding circuit 32. The frequency area zero insertion circuit 36 inserts zero in parts other than the 4×4 DCT coefficient parts in an output of the simplified inverse quantization circuit 34. The simplified inverse DCT circuit 38 applies inverse discrete cosine transformation to an output of the frequency area zero insertion circuit 36. The motion compensation circuit 30 compensates for motions of a P picture and B pictures in an output of the simplified inverse DCT circuit 38 and outputs restored image data.

Operations of concurrently used decoding processing systems B and C will be described.

Figure 4:
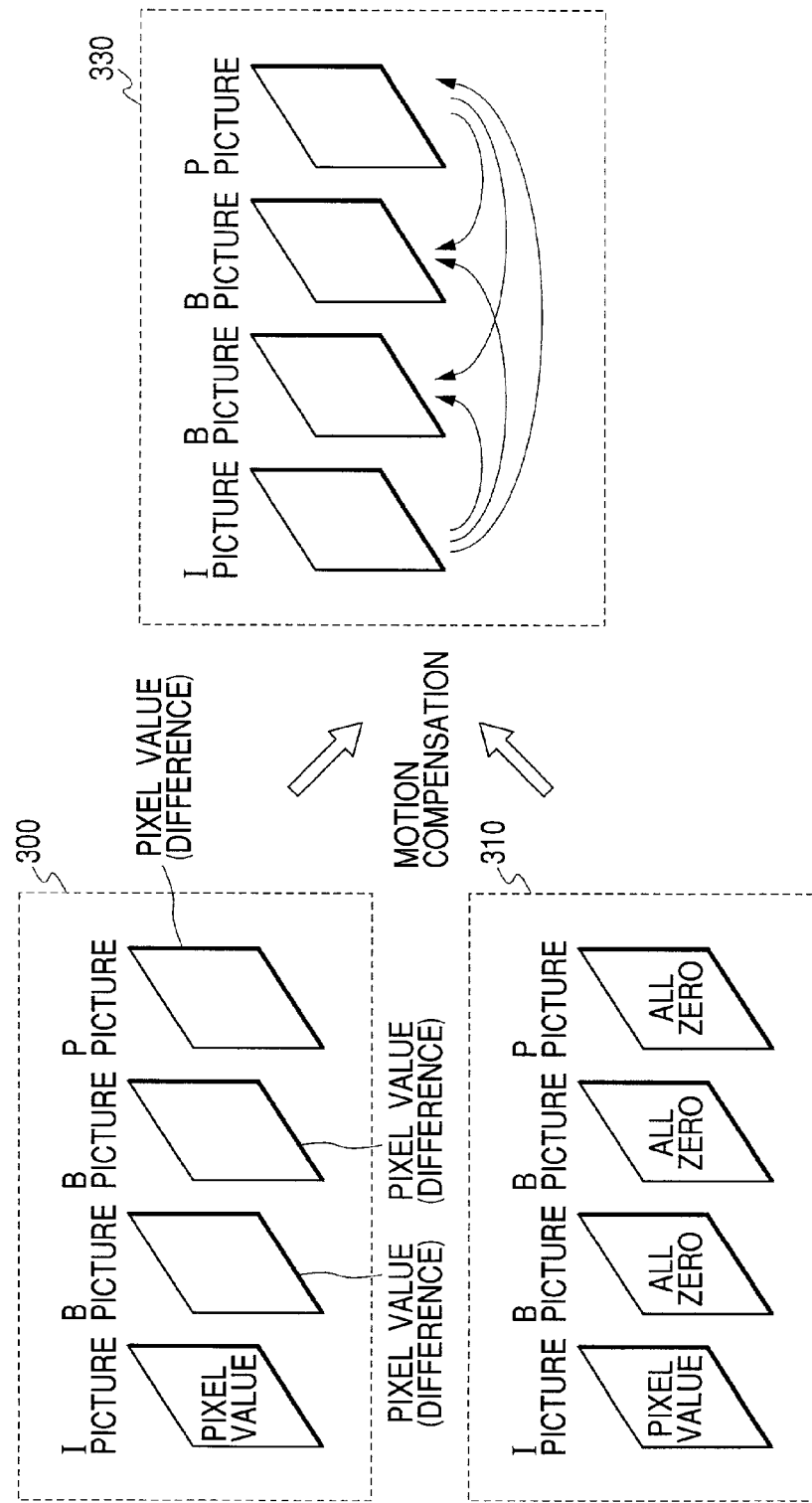
FIG. 4 schematically illustrates relations among an I picture, a P picture and B pictures in accordance with the present invention.

FIG. 4 schematically illustrates relations among an I picture, a P picture and B pictures in the case in which the decoding processing system B and the decoding processing system C are concurrently used.

The I picture is an image that is applied intra-picture encoding, the P picture is an image that is applied differential encoding with uni-directional prediction and the B pictures are images that are applied differential encoding with bi-directional prediction. The decoding processing system B is used for decoding of the I picture and the decoding processing system C is used for decoding of the P picture and the B pictures.

As described above, image data of the I picture is restored by the simplified variable length decoding circuit 32, the simplified inverse quantization circuit 34, the frequency area zero insertion circuit 36, the simplified inverse DCT circuit 38 and the motion compensation circuit 30. Reference numeral 300 denotes a result of processing of the decoding processing system B. In this case, the motion compensation circuit 30 stores the restored image data of the I picture in an internal memory for use in the following P picture and B pictures while outputting output data of the simplified inverse DCT circuit 38 without change. The spatial area zero insertion circuit 40 outputs 8×8 pixel data with zero substituted for all the elements as indicated by 310 with respect to the P picture and the B pictures. The motion compensation circuit 30 compensates for motions of the P picture and the B pictures using the I picture decoded in the decoding processing system B as indicated by 330.

It is obvious that a circuit for outputting 8×8 pixel data with zero substituted for all the elements may be simply provided instead of the spatial area zero insertion circuit 40.

As indicated by 330, the motion compensation circuit 30 restores image data of the P picture by the I picture and restores images of the B pictures by the I picture and the P picture. A processing load is light for the P picture and the B pictures because images are restored from the I picture before or after them in the motion compensation processing.

Figure 5:
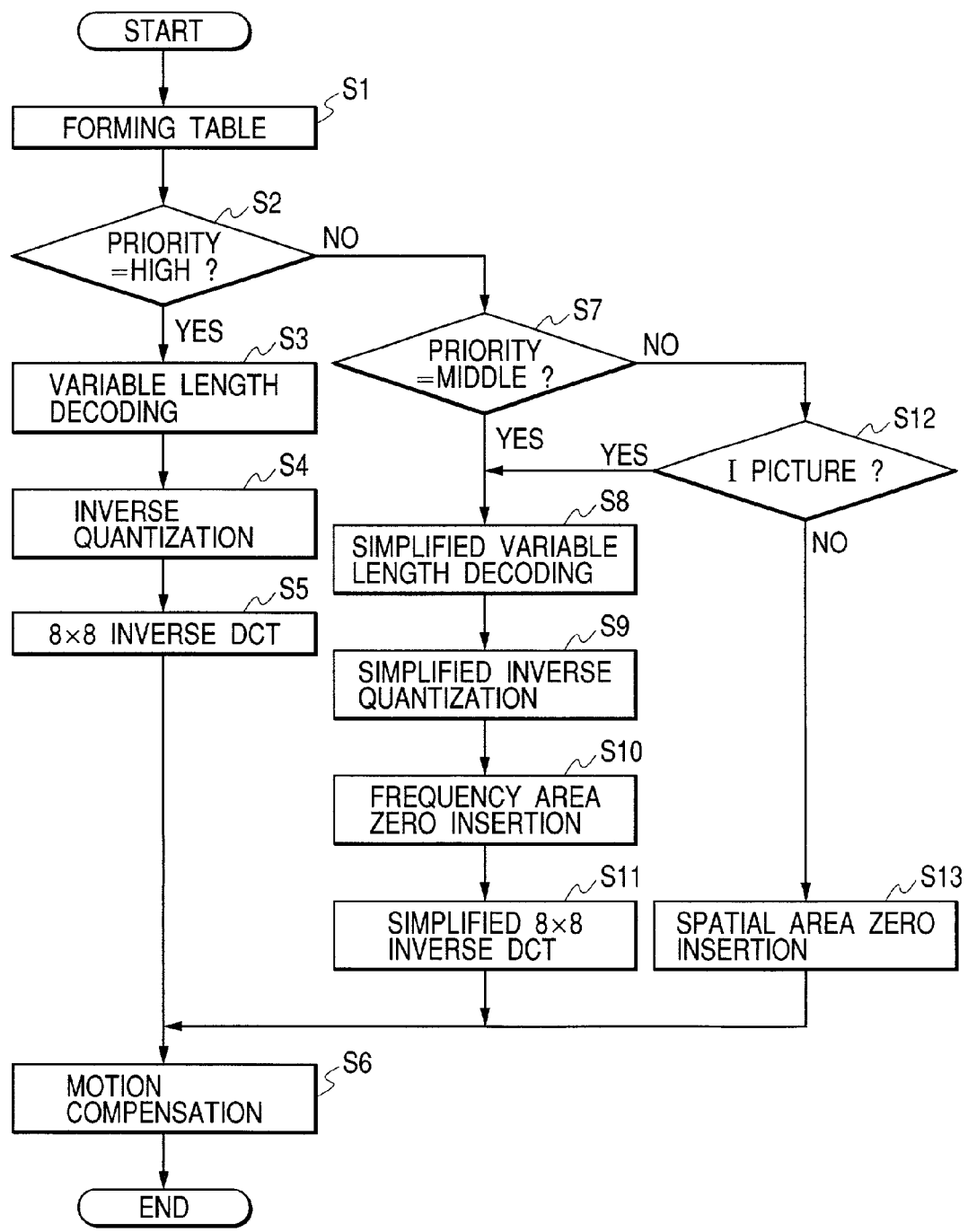
FIG. 5 is a flow chart for describing processing operations of decoding processing systems A, B and C of the first embodiment.

Operations of the table formation circuit 18, the switching circuit 22 and the decoding processing systems A, B and C are now described in detail with reference to a flow chart shown in FIG. 5.

The table formation circuit 18 receives information of a received image size from the demultiplexer 14 and, at the same time, receives information on a ratio between the received image size and a window size from the display control device 46 and the system control circuit 54, assigns priority to each stream based on the information and forms a map table of stream IDs and priority (S1). The switching circuit 22 selects the decoding processing system A, B or C with reference to the map table.

If priority of a stream is "high" (S2), variable length decoding (S3), inverse quantization (S4), inverse DCT (S5) and motion compensation (S6) are applied to the stream in the decoding processing system A.

If priority of a stream is "middle" (S7), simplified variable length decoding (S8), simplified inverse quantization (S9), frequency area zero insertion (S10), simplified inverse DCT (S11) and motion compensation (S6) are applied to the stream in the decoding processing system B.

If priority of a stream is "low" (S7), simplified variable length decoding (S8), simplified inverse quantization (S9), frequency area zero insertion (S10), simplified inverse DCT (S11) and motion compensation (S6) are applied to the stream only for the I picture (S12) in the decoding processing system B. Spatial area zero insertion (S13) and motion compensation (S6) are applied to the stream for the P picture and the B pictures in the decoding processing system C.

Figure 6:
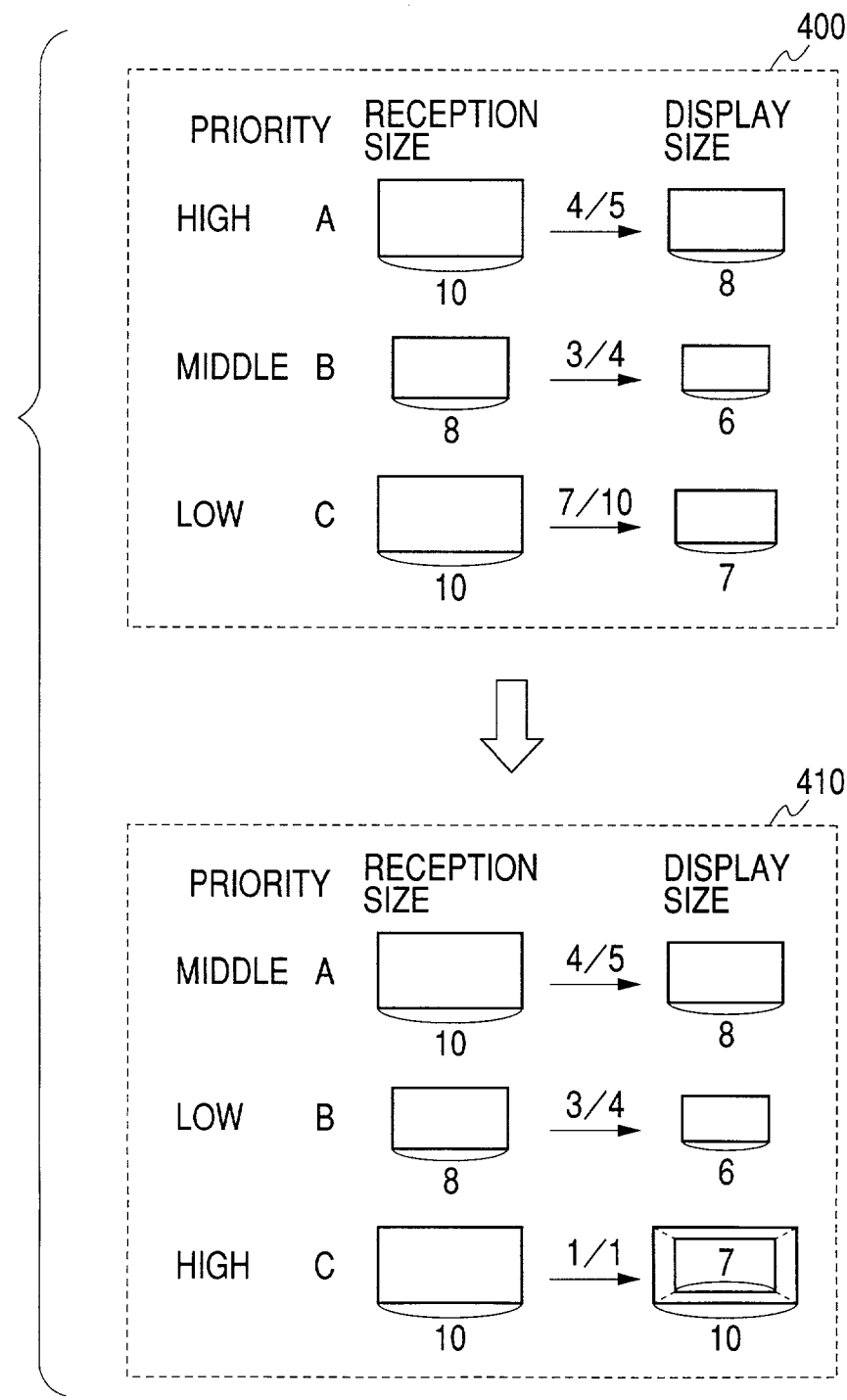
FIG. 6 illustrates an example of a change in priority in the first embodiment.

FIG. 6 shows an example of a change in priority.

A change in priority in the embodiment shown in FIG. 2 is now described with reference to FIG. 6.

It is assumed that a ratio of horizontal sizes of videos of the streams A, B and C is 10:8:10, respectively, when they are received and a ratio of horizontal sizes of the videos is 8:6:7 when they are displayed. Then, ratios of reduction of the streams A, B and C are four fifth, three quarter and seven tenth, respectively. If priority is assigned in order from the greatest ratio to the smallest ratio, the priority is in the order of the streams A, B and C. Accordingly, as indicated by 400 in FIG. 6, the stream A is processed in the decoding processing system A, the stream B is processed in the decoding processing system B and the stream C is processed in the decoding processing systems B and C.

It is assumed that the display size of the stream C is changed from 7 to 10 according to an instruction from the system control circuit 54. As a result, the reduction ratio of the stream C becomes 1 and the priority is changed to the order of C, A and B. Accordingly, as indicated by 410 in FIG. 6, the stream A is processed in the decoding processing system B, the stream B is processed in the decoding processing systems B and C and the stream C is processed in the decoding processing system A.

Figure 7:
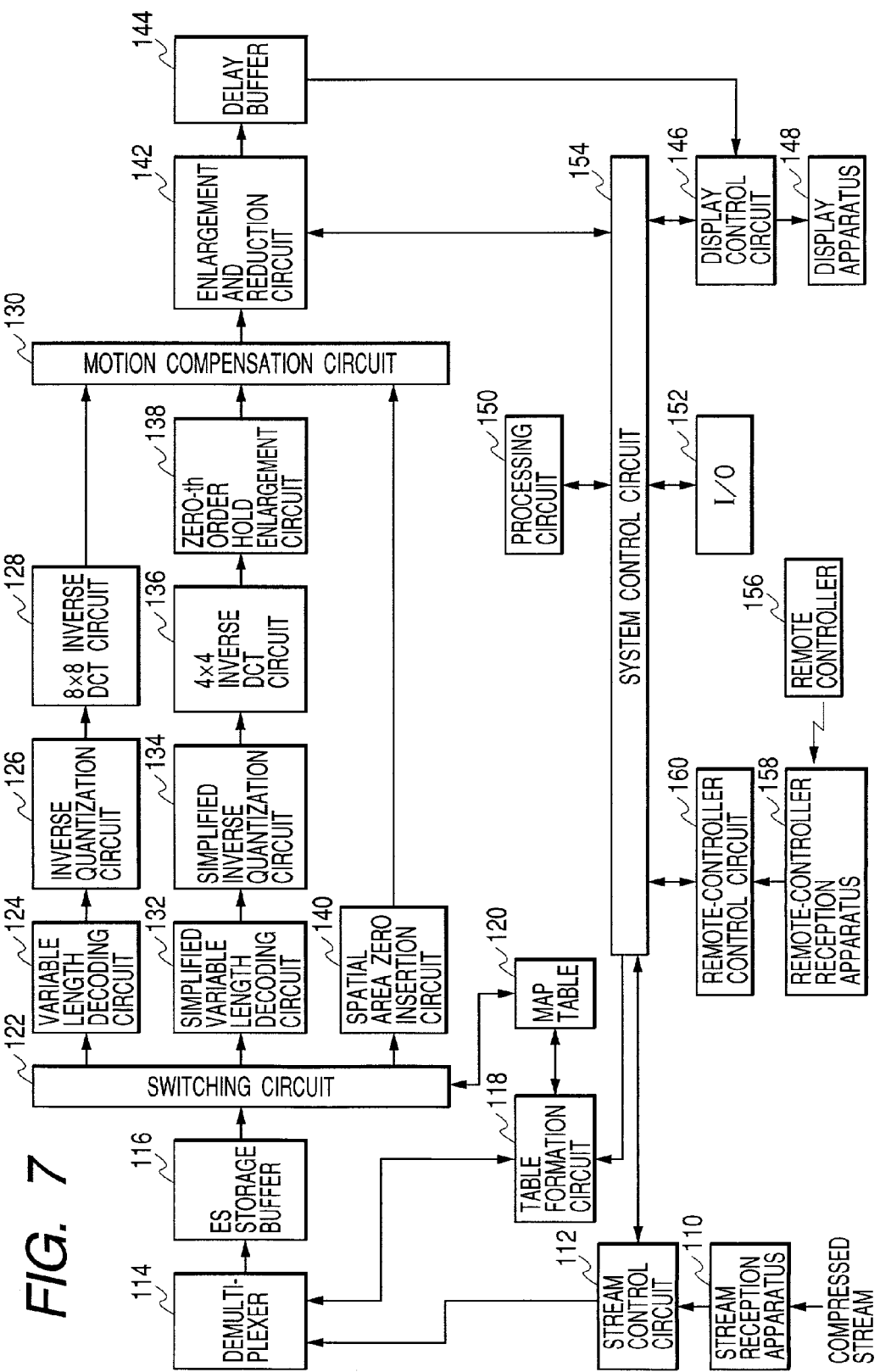
FIG. 7 is a block diagram showing a configuration of a digital television receiver of a second embodiment in accordance with the present invention.

FIG. 7 is a block diagram showing a configuration of a digital television receiver of a second embodiment in accordance with the present invention.

A stream reception apparatus 110 receives a compressed stream from a tuner (not shown) and applies the received compressed stream to a demultiplexer 114 via a stream control circuit 112.

The demultiplexer 114 separates an incoming compressed stream into individual elementary streams (ES) to store them in the ES storage buffer 116.

A table formation circuit 118 assigns priority to each stream in accordance with a designation of a user from a remote-control control circuit 160 and a system control circuit 154 and forms a map table 120 showing association between stream IDs and the priority. A switching circuit 122 outputs a compressed stream stored in the ES storage buffer 116 to any one of three decoding processing systems A, B and C with reference to the map table 120.

The decoding processing system A consists of a variable length decoding circuit 124, an inverse quantization circuit 126, an 8×8 inverse DCT circuit 128 and a motion compensation circuit 130. The decoding processing system B consists of a simplified variable length decoding circuit 132, a simplified inverse quantization circuit 134, a 4×4 inverse DCT circuit 136, a zero-th order hold enlargement circuit 138 and the motion compensation circuit 130. The decoding processing system C consists of a spatial area zero insertion circuit 140 and the motion compensation circuit 130. The motion compensation circuit 130 is utilized in any of the decoding processing systems A, B and C.

The decoding processing system A restores a compressed image with a normal image quality, the decoding processing system B restores a compressed image with a low image quality and the decoding processing system C substantially replaces differential image data of a P picture and B pictures of a received image, that is, pictures to which differential decoding is applied, with zero. Details of the processing of each of the decoding processing systems A, B and C will be described later.

An enlargement and reduction circuit 142 enlarges and reduces an image outputted from the motion compensation circuit 130 to a size adjusted to a window size for displaying an image, which size is instructed by a system control circuit 154. An output of the enlargement and reduction circuit 142 is temporarily stored in a delay buffer 144 and read out at timing synchronizingly adjusted by a system control circuit 154 and a display control circuit 146 to be applied to a display apparatus 148. The display apparatus 148 consists of a CRT or a liquid crystal display device and displays image data from the display control circuit 146 as an image.

A processing circuit 150 performs processings other than decoding processing, such as image editing and downloading, and an I/O 152 connects the digital television receiver to other apparatuses such as a scanner and a printer.

A remote control reception device 158 receives a remote control signal from a remote controller 156 and notifies the system control circuit 154 of the receipt via a remote-control control circuit 160. Consequently, various instructions of a user such as channel switching are sent to the system control circuit 154.

Figure 1:
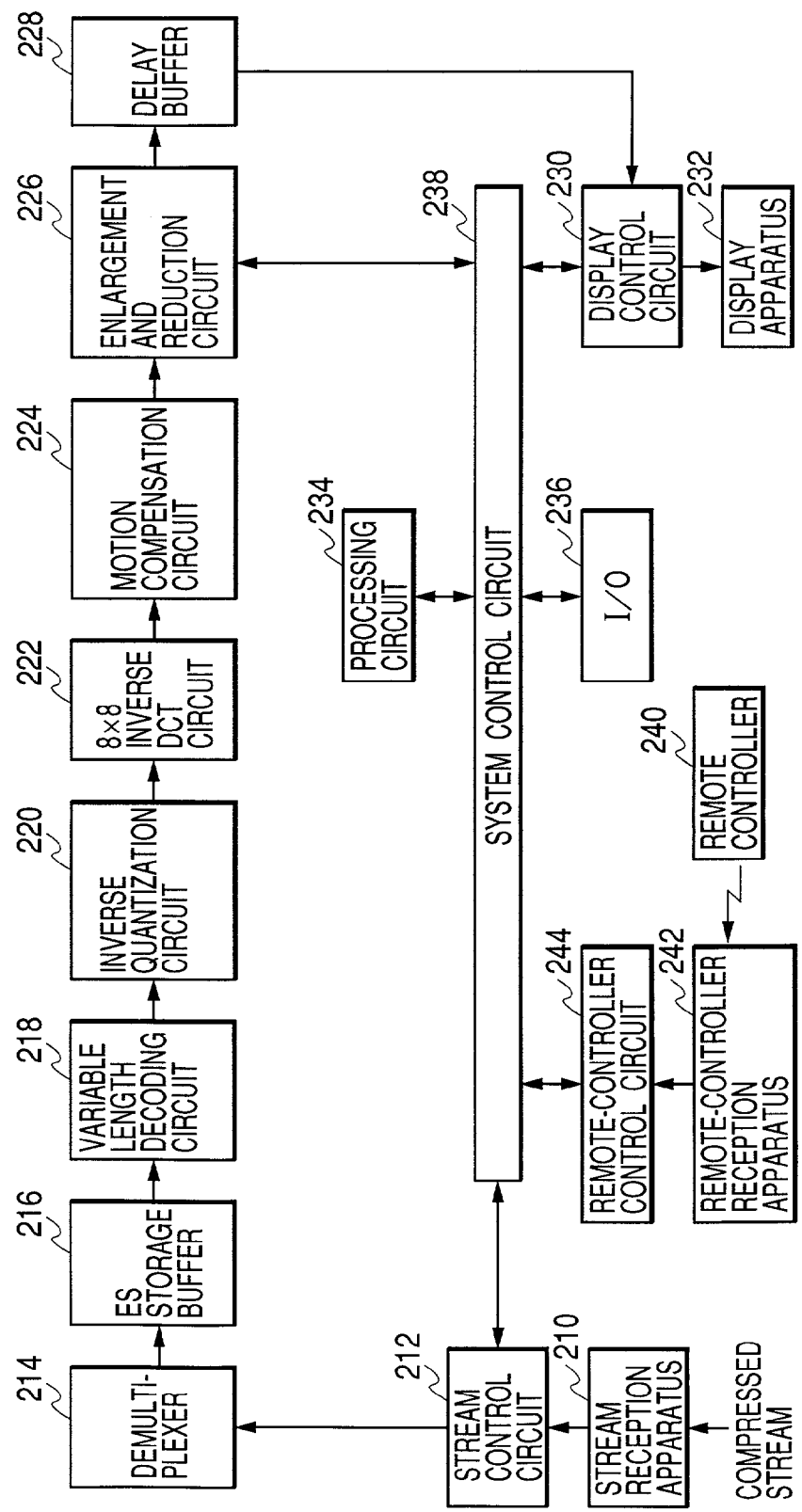
FIG. 1 is a block diagram showing a configuration of a conventional decoding apparatus.

In this embodiment, processing is switched among processing by the decoding processing system A, processing by the decoding processing system B and the processing by the decoding processing systems B and C according to a load and a required image quality as in the embodiment shown in FIG. 1. A load and an image quality decrease in this order of the processings.

Since operations of the decoding processing system A is the same as the operations of the decoding processing system A of the embodiment shown in FIG. 2, a detailed description of the operations is omitted.

Operations of the decoding processing system B are now described. The decoding processing system B restores a compressed image with a lower image quality by light-load calculation.

Figure 8:
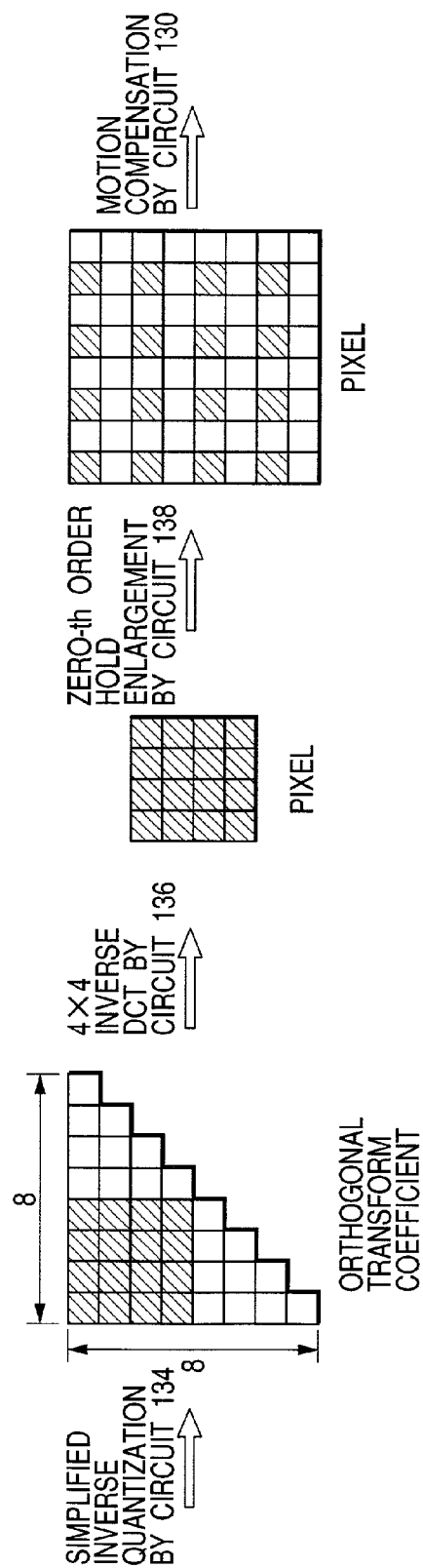
FIG. 8 schematically illustrates processing steps of a decoding processing system B of the second embodiment.

FIG. 8 schematically illustrates processing steps of the decoding processing system B.

The simplified variable length decoding circuit 132 applies variable length decoding to only parts relating to a 4×4 DCT coefficient in a compressed stream stored in the ES storage buffer 116. The simplified inverse quantization circuit 134 inversely quantizes an output of the simplified variable length decoding circuit 132. The 4×4 inverse DCT circuit 136 applies inverse DCT transformation to an output of the simplified inverse quantization circuit 134 and outputs 4×4 image data. The zero-th order hold enlargement circuit 138 applies enlarging processing to 4×4 image data from the inverse DCT circuit 136 to enlarge it to 8×8. The motion compensation circuit 130 compensates for motions of a P picture and B pictures in an output of the zero-th order hold enlargement circuit 138 and outputs restored image data.

Operations of concurrently used decoding processing systems B and C are now described.

In an embodiment shown in FIG. 7, for the stream of the lowest priority, the decoding processing system B is used for decoding of an I picture and the decoding processing system C is used for decoding of a P picture and B pictures.

As described above, image data of the I picture is restored by the simplified variable length decoding circuit 132, the simplified inverse quantization circuit 134, the 4×4 inverse DCT circuit 136, the zero-th order hold enlargement circuit 138 and the motion compensation circuit 130. In this case, the motion compensation circuit 130 stores the restored image data of the I picture in an internal memory for use in the following P picture and B pictures while outputting output image data of the zero-th order hold enlargement circuit 138 without change. The spatial area zero insertion circuit 140 outputs 8×8 pixel data with zero substituted for all the elements with respect to the P picture and the B pictures. The motion compensation circuit 130 compensates for motions of the P picture and the B pictures using the I picture decoded in the decoding processing system B. It is obvious that a circuit for outputting 8×8 pixel data with zero substituted for all the elements may be simply provided instead of the spatial area zero insertion circuit 140.

The motion compensation circuit 130 restores image data of the P picture by using the I picture and restores images of the B pictures by using the I picture and the P picture. A processing load is light for the P picture and the B pictures because images are restored from the I picture before or after them in the motion compensation processing.

Figure 9:
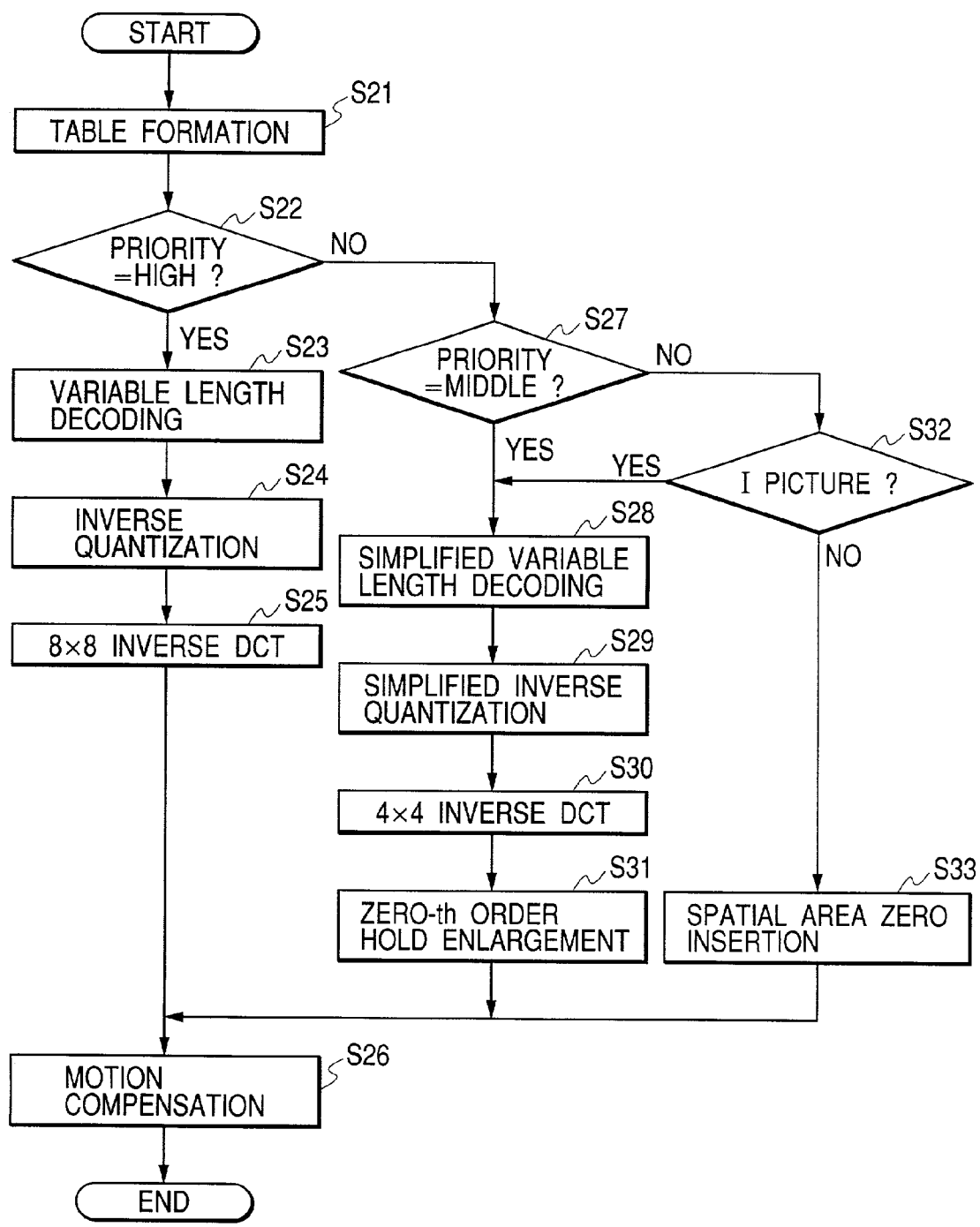
FIG. 9 is a flow chart for describing processing operations of decoding processing systems A, B and C of the second embodiment.

Operations of the table formation circuit 118, the switching circuit 122 and the decoding processing systems A, B and C will be described in detail with reference to a flow chart shown in FIG. 9.

The table formation circuit 118 assigns priority to each stream based on the priority designated by a user from the remote control circuit 160 and the system control circuit 154 and forms a map table of stream IDs and priority (S21).

The switching circuit 122 selects the decoding processing system A, B or C with reference to the map table.

If priority of a stream is "high" (S22), variable length decoding (S23), inverse quantization (S24), 8×8 inverse DCT (S25) and motion compensation (S26) are applied to the stream in the decoding processing system A.

If priority of a stream is "middle" (S27), simplified variable length decoding (S28), simplified inverse quantization (S29), 4×4 inverse DCT (S30), the zero-th order hold enlargement (S31), and motion compensation (S26) are applied to the stream in the decoding processing system B.

If priority of a stream is "low" (S27), simplified variable length decoding (S28), simplified inverse quantization (S29), 4×4 inverse DCT (S30), the zero-th order hold enlargement circuit (S31), and motion compensation (S26) are applied to the stream only for the I picture (S32) in the decoding processing system B. Spatial area zero insertion (S33) and motion compensation (S36) are applied to the stream for the P picture and the B pictures in the decoding processing system C.

FIG. 10 shows an example of a change in priority. A change in priority in the embodiment shown in FIG. 7 will be described with reference to FIG. 10.

As indicated by 500 in FIG. 10, it is assumed that a screen is divided into four windows, #1, #2, #3 and #4, each of which displays a different television program. A user can select a specific window by the remote controller 156 to make priority of a stream in the window highest.

It is assumed that a stream A, a stream B, a stream C and a stream D are displayed on the window #1, the window #2, the window #3 and the window #4, respectively, and priority of the stream A in the window #1 is "high" which is the highest, priority of the stream C in the window #3 is "middle" which is the second highest and priority of the other streams in the other windows is "low" which is the lowest. Here, as indicated by 520 in FIG. 10, the user changes a window that the user is watching to the window #2 (on the screen, a bold frame indicating a window being watched is moved right to another window), whereby the priority of the stream B in the window #2 can be changed to "high". The priority of the stream A in the window #1, which was selected as a window being watched immediately before the change, simultaneously is changed to "middle" and the priority of the streams of the remaining windows is changed to "low".

As it is readily understood from the above descriptions, according to this embodiment, priority of decoding a plurality of compressed streams can be determined with simple operations or processing and restored information with little or no frame drop-outs or sound skipping can be obtained for a desired stream.

Further, decoding of encoded stream data is also implemented as follows. A program code of software for realizing the functions of the above-mentioned embodiments is supplied to a computer (CPU or MPU) in an apparatus or a system connected to various devices in order to cause the various devices to operate for realizing the functions of the above-mentioned embodiments. Then, the computer of the apparatus or the system causes the various devices to operate in accordance with the stored program. This implementation is also included in the scope of the present invention.

In this case, the program code itself of the software realizes the functions of the above-mentioned embodiments. Thus, the program code itself and means for supplying the program code to the computer, for example, a storage medium having such a program code stored therein also constitute the present invention. As a storage medium for storing such a program code, for example, a floppy disc, a hard disc, an optical disc, a magneto-optical disc, a CD-ROM, a magnetic tape, a non-volatile memory card, a ROM and the like can be used.

In addition, the functions of the above-mentioned embodiments are not only realized by a computer executing a program code supplied to it but also realized by the program code cooperating with an OS (Operating System) operating in the computer, other application software or the like. It is needless to mention that such a program code is included in the embodiments of the present invention.

Moreover, a supplied program code is stored in a memory provided in a function expansion board of a computer or a function expansion unit connected to the computer and, then, a CPU or the like provided in the function expansion board or the function expansion unit executes a part or all of actual processing based on an instruction of the program code, whereby the functions of the above-mentioned embodiments are realized. It is needless to mention that this implementation is also included in the present invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A decoding apparatus comprising:
   inputting means for inputting a plurality of encoded streams separated from compressed streaming data including encoded image data;
   setting means for adaptively setting a priority of each of the plurality of encoded streams inputted by said inputting means, wherein said setting means is capable of changing the priority set as each of the plurality of encoded streams sets the priority according to a ratio between the size of the compressed streaming data and the size of an image to be displayed in a display device; and
   decoding means for decoding the plurality of encoded streams by decoding processing that is weighted according to the priority set by said setting means.

2. An apparatus according to claim 1, wherein said encoded streams include data that is image data to which orthogonal transform processing, quantization processing and encoding are applied.

3. An apparatus according to claim 2, wherein said decoding means is provided with a plurality of decoding processings, and the plurality of kinds of decoding processings include a processing for applying inverse orthogonal transformation only to at least a part of orthogonal transform coefficients and inserting zero in the remaining orthogonal transform coefficients to decode them.

4. An apparatus according to claim 2, wherein said encoded streams include image data encoded by the MPEG-2 coding method.

5. An apparatus according to claim 2, wherein said encoded streams include image data that is encoded by the MPEG-1 coding method.

6. An apparatus according to claim 2, wherein said encoded streams include image data that is encoded by the Motion JPEG coding method.

7. An apparatus according to claim 2, further comprising displaying means for displaying image data of a plurality of encoded streams decoded by said decoding means.

8. An apparatus according to claim 1, wherein said decoding means includes first decoding processing for decoding all data at least in an encoded stream and second decoding processing for decoding only a part of data in an encoded stream and selects the decoding processing according to the priority determined by said determining means.

9. A decoding method comprising the steps of:
   inputting a plurality of encoded streams separated from compressed streaming data including encoded image data;
   adaptively setting a priority of each of the inputted plurality of encoded streams, wherein said setting step is capable of changing the priority set as each of the plurality of encoded streams and sets the priority according to a ratio between the size of the compressed streaming data and the size of an image to be displayed in a display device; and
   decoding the plurality of encoded streams by decoding processing that is weighted according to the set priority.

10. A decoding processing program including program codes recorded in a computer-readable medium, said program codes comprising:
   a code of a step of inputting a plurality of encoded streams separated from compressed streaming data including encoded image data;
   a code of a step of setting a priority of each of the inputted plurality of encoded streams, wherein said setting step is able to change the priority set as each of the plurality of encoded streams and sets the priority according to a ratio between the size of the compressed streaming data and the size of an image to be displayed in a display device; and
   a code of a step of decoding the plurality of encoded stream by decoding processing that is weighted according to the set priority.

11. A decoding apparatus comprising:
an inputting unit, arranged to input a plurality of encoded streams separated from compressed streaming data including encoded image data;
a setting unit, arranged to set a priority of each of the plurality of encoded streams inputted by said inputting means adaptively, wherein said setting unit is capable of changing the priority set as each of the plurality of encoded streams and sets the priority according to a ratio between the size of the compressed streaming data and the size of an image to be displayed in a display device; and
a decoding unit, arranged to decode the plurality of encoded streams by decoding processing that is weighted according to the priority set by said setting unit.

* * * * *